J. F. HARCOURT & G. W. COTTINGHAM.
Improvement in Fish and Animal Traps.
No. 131,439. Patented Sep. 17, 1872.
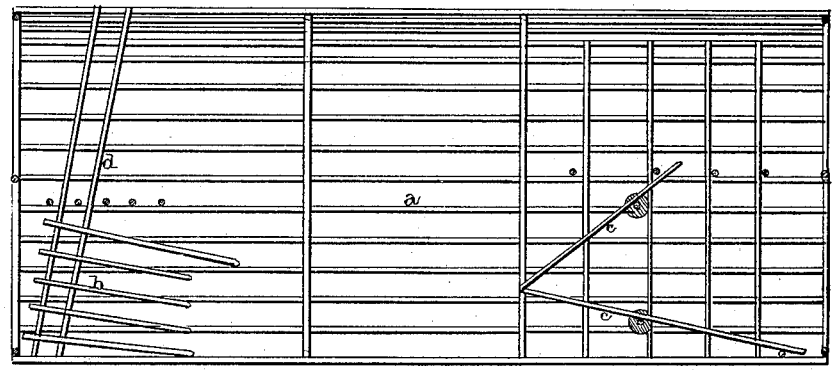
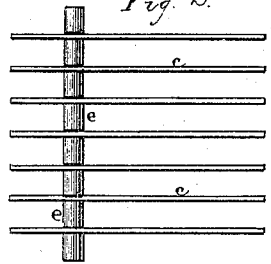

UNITED STATES PATENT OFFICE.

JOHN T. HARCOURT AND GIDEON W. COTTINGHAM, OF COLUMBUS, TEXAS.

IMPROVEMENT IN FISH AND ANIMAL TRAPS.

Specification forming part of Letters Patent No. 131,439, dated September 17, 1872.

*To all whom it may concern:*

Be it known that we, GIDEON W. COTTINGHAM and JNO. T. HARCOURT, of Columbus, in the county of Colorado and State of Texas, have invented certain new and useful Improvements in Traps; and we do hereby declare that the following is a full, clear, and exact description thereof, that will enable others skilled in the art to which it appertains to make and use the same, reference being had to the accompanying drawing and to the letters of reference marked thereon which form a part of this specification.

The nature of our invention consists in the construction of a trap which may be used for catching either fish or animals, and the peculiar manner of making the doors self-closing; also in the construction of the doors, as will hereafter be more fully set forth.

Figure 1 is a longitudinal section of our trap. Fig. 2 is a plan view of one of the doors.

$a$ represents an ordinary wire-trap, which is provided with two self-closing doors, $b$ $c$, at each end. The one $b$ consists of a number of straight pointed wires or rods, which are secured to a rod, $d$. This rod has its ends supported in suitable bearings, and is inclined forward toward the center of the trap, so that the wires which form the doors will swing forward by their own gravity until their ends meet, thus forming a door which will readily open to let the fish or animal pass in, but will not let them out again. At the opposite end is the door or gate $c$, which also consists of wire or rods hung eccentrically upon their bearings so as to close automatically instead of being fixed to a vertical shaft. These wires are pivoted by means of the short sleeves $e$ to horizontal bars, and move vertically in opening and closing, instead of horizontally like the ones $b$. Each of the wires of the doors $c$ is attached to a loose sleeve or collar, $e$, which allows each one a free and independent movement of its own. When all are secured together, so that in order to let an animal or fish in the whole gate must be moved, either the small ones will not be able to move the gate at all, or having once gotten in can easily escape when the gates are opened by the entrance of other larger fish or animals. But when each wire is made independent, the moment the fish or animal passes in they close immediately without giving an opportunity of escape to the others, for in passing in it will open only just enough of the gate to get its body through. These gates $b$ and $c$ may be used together, as shown in the model, or separately, as may be desired.

Having thus described our invention, what we claim, and desire to secure by Letters Patent, is—

1. A trap-door or gate, in which each wire or rod is hinged separately, so as to give them an independent movement, substantially as set forth.

2. The trap-door or gate, consisting of the wires and sleeves $e$, substantially as specified.

3. The gates $b$ $c$ eccentrically pivoted, so as to close by their own gravity, substantially as shown.

In testimony that we claim the foregoing we have hereunto set our hands this 19th day of August, 1872.

JNO. T. HARCOURT.
G. W. COTTINGHAM.

Witnesses:
ROBT. L. FOARD,
JOHN H. BOWERS.